(12) United States Patent
Barrett et al.

(10) Patent No.: US 6,669,222 B1
(45) Date of Patent: Dec. 30, 2003

(54) FOLDING UNICYCLE ATTACHMENT FOR A WHEELCHAIR

(76) Inventors: John M. Barrett, 2889 Gilham Rd., Eugene, OR (US) 97408; N. Hanz Scholz, 87432 Halderson Rd., Eugene, OR (US) 97402

( * ) Notice: Subject to any disclaimer, the term of this patent is extended or adjusted under 35 U.S.C. 154(b) by 0 days.

(21) Appl. No.: 10/215,941

(22) Filed: Aug. 9, 2002

(51) Int. Cl.[7] ................................................ B62M 1/14
(52) U.S. Cl. ................................ 280/304.1; 280/250.1; 280/250
(58) Field of Search ............................. 280/7.1, 7.15, 280/242.1, 250, 250.1, 278, 287, 293, 295, 296, 304.1; 297/DIG. 4

(56) References Cited

U.S. PATENT DOCUMENTS

| | | |
|---|---|---|
| 3,485,510 A | 12/1969 | Merlan |
| 4,316,616 A | 2/1982 | Boivin |
| 4,471,972 A | 9/1984 | Young |
| 4,483,548 A | 11/1984 | Zirrilo |
| 4,720,117 A | 1/1988 | Hay |
| 5,022,671 A | 6/1991 | Jones |
| 5,383,676 A * | 1/1995 | Valentino .................... 280/250 |
| 5,501,480 A * | 3/1996 | Ordelman et al. ........ 280/304.1 |
| 5,873,589 A | 2/1999 | Hallett |
| 5,899,476 A * | 5/1999 | Noyola .................... 280/250.1 |
| 6,105,986 A | 8/2000 | Franks |

OTHER PUBLICATIONS www.praschberger.com . . . p. 1 Downloaded Feb. 23, 2002.
www.sunrisemedical.com . . . pp 1 & 2 Downloaded Feb. 23, 2002.
Page From a Sunrise Have Health Care Group Catalog–date unknown.
Freedom Ryder Advertisement–date unknown.

\* cited by examiner

*Primary Examiner*—Lesley D. Morris
*Assistant Examiner*—Matt Luby
(74) *Attorney, Agent, or Firm*—Robert E. Howard (57) ABSTRACT

A foldable unicycle attachable to a wheelchair to form a hand driven tricycle. The unicycle has upper and lower drive train frames. The means for attaching the unicycle to a wheelchair includes a positioning stand that holds the unicycle and its attachment means in a position adapted to receive and engage hitch means attached to the wheelchair frame. The positioning stand of the unicycle and the front castor wheels of the wheelchair are lifted off the ground during engagement of the unicycle attachment means to the hitch means of the wheelchair. The upper drive train frame includes means to allow it to be folded downwardly into a position adjacent the outer face of the lower drive train frame, and the unicycle attachment means includes means to allow it to be folded downwardly into a position adjacent the inner face of the lower drive train frame.

15 Claims, 6 Drawing Sheets

FOLDING UNICYCLE ATTACHMENT FOR A WHEELCHAIR

BACKGROUND OF THE INVENTION

The present invention relates to a folding unicycle that can be easily attached to a wheelchair solely by the wheelchair occupant while the occupant is seated in the wheelchair, thereby converting the wheelchair into a hand cranked tricycle.

Several prior art unicycle devices have been suggested for converting a wheelchair into a hand cranked tricycle. However, most of these devices are not foldable for easy transport and storage, and all have complicated means for attaching the unicycle to the wheelchair, which attachment means cannot be operated solely by a wheelchair occupant while seated in the wheelchair.

U.S. Pat. No. 3,485,510 describes a hand driven unicycle 20 for attachment to the front of a wheelchair 22 to form a tricycle. The attachment means includes a unicycle frame member 26 having a rear engagement end 28 attached to a bearing means 40 which is affixed to a transverse member 36 the ends of which are connected to a quick connect/disconnect means 32. The unicycle described in the '510 patent cannot be folded, and attachment requires modification of the existing wheelchair, including removal of the front wheels, which cannot be easily done by a wheelchair user.

U.S. Pat. No. 4,316,616 describes a hand driven unicycle for attachment to the front of a wheelchair to form a tricycle. A generally rectangular rear framework formed by telescoping horizontal tube members 31, 32, 34, 35, 36 and 37 and vertical tube members 33 and 38 is removably attachable to the front frame portion of the wheelchair. An upper bar 49 and lower, telescoping bar 52, 53 attaches the rear framework to the sleeve 11 of the unicycle. A tension spring 57 is attached to the outer section of bar 53 and to the outer end of an L-shaped arm 59 secured to the lower end of steering post 9. Tension spring 57 automatically aligns the main wheel 12 in the central longitudinal plane of the wheelchair and attachment assembly when the crank arms 18 are released. The unicycle described in the '616 patent cannot be folded and does not have an attachment means which can be easily operated by the wheelchair user.

U.S. Pat. No. 4,471,972 describes a foldable, hand driven unicycle 100 for attachment to the front of a wheelchair W to form a tricycle. The unicycle attachment means includes a frame 150 with attachment means 110 (FIG. 2) or 120 (FIGS. 7 and 8) for attaching the unicycle to the various frame members 61 of the frame W of a wheelchair. The attachment means 120 shown in FIGS. 7 and 8 (involving inserting frame member 55' into a slot on the wheelchair engaging frame 120) which raises the castor wheels above the ground when locked into place. Frame members 52 and 55 of the unicycle can be folded upwardly from the position shown in FIGS. 1 and 2 to that shown in FIG. 3 for storage. The attachment means cannot be easily operated solely by a wheelchair user.

U.S. Pat. No. 4,483,548 describes a hand driven unicycle 10 for attachment to the front of a wheel chair to form a tricycle. A front tubular housing 50 has a mounting post 51 rotatable within housing 50. Mounting post 51 has a wheel 13 rotatably mounted thereon. Two rearwardly extending main posts 64 and 65 are fixedly attached at one of their ends to tubular housing 50. The other end of post 64 is fixedly attached to tube 29 of a frame attachable to the wheelchair, and the other end of post 65 is slidably received into tube 66 secured to tube 26 of the attachment frame. Post 65 is adjusted within tube 66 a distance to cause the small castor wheels 70 to be lifted off the ground. The unicycle of the '548 patent is not foldable, and is not connectable to the wheelchair with attachment means that can be easily operated solely by the wheelchair user.

U.S. Pat. No. 4,720,117 describes a hand driven unicycle 10 for attachment to the front of a wheelchair 12 to form a tricycle by an attachment frame 14. The unicycle is not foldable and is connectable to the wheelchair by use of four separate attachment means which are difficult to manipulate solely by the wheelchair user.

SUMMARY OF THE INVENTION

The present invention relates to a foldable unicycle that is attachable to a wheelchair to form a hand driven tricycle. The unicycle has upper and lower drive train frames and means for attaching the unicycle to a wheelchair.

The means for attaching the unicycle to a wheelchair includes a positioning stand that holds the unicycle and its attachment means in a position adapted to receive a hitch means attached to the wheelchair frame. Latching means releasably latch together the attachment means and hitch means. The positioning stand of the unicycle and the front castor wheels of the wheelchair are lifted off the ground during latching of the unicycle attachment means to the hitch means of the wheelchair.

For easy transport and storage of the unicycle, folding means are provided for folding the upper drive train frame downwardly into a position adjacent the lower drive train frame. Folding means are also provided for folding the unicycle attachment means downwardly into a position adjacent the lower drive train frame.

DESCRIPTION OF PREFERRED EMBODIMENTS

Figure 1:
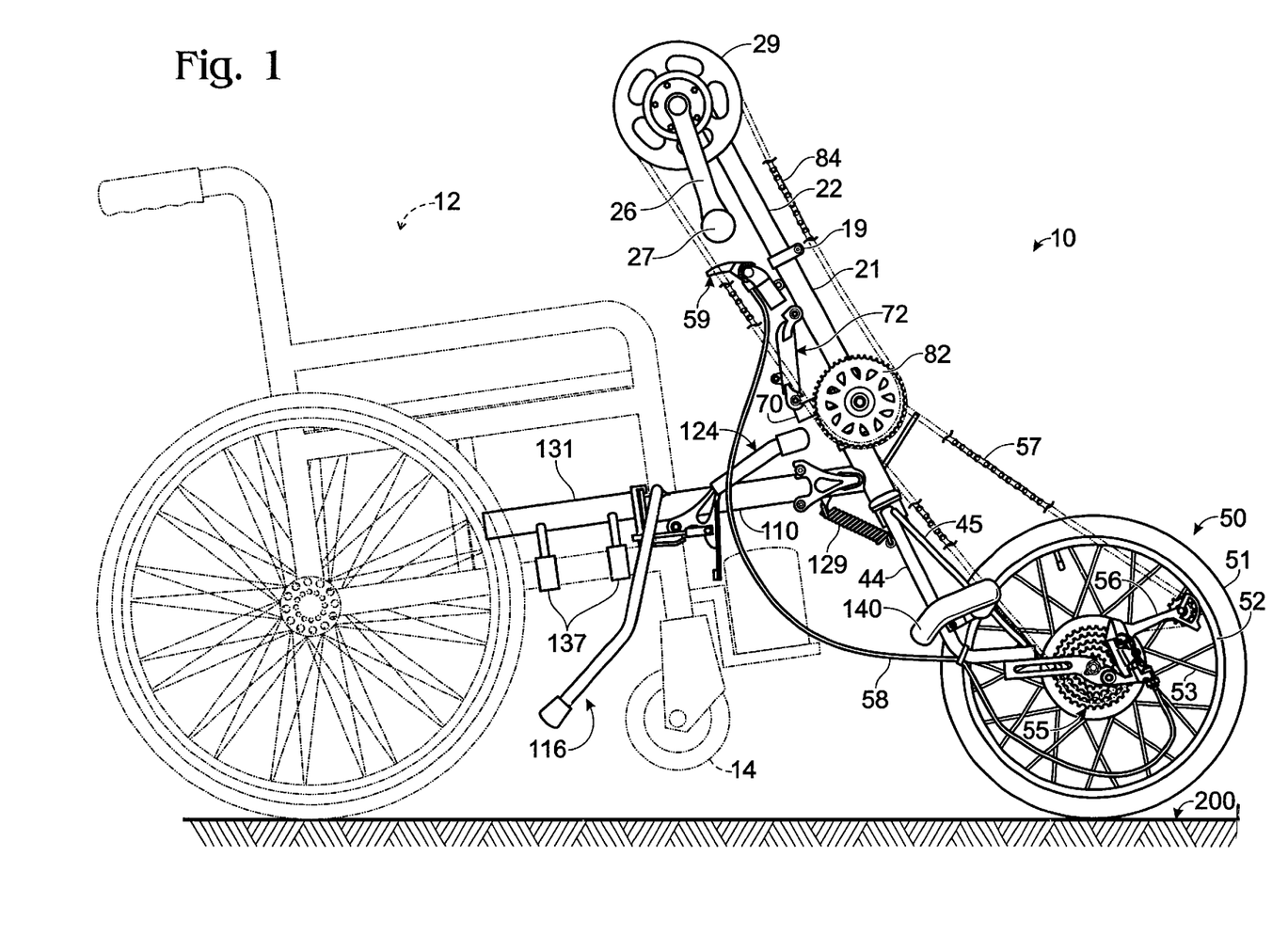
FIG. 1 is a right side elevation view of the folding unicycle of the present invention shown attached to a wheelchair (outlined in phantom)

The foldable unicycle 10 of the present invention can be easily attached to a wheelchair, such as wheelchair 12 shown in phantom in FIG. 1, by a wheelchair occupant while the occupant (not shown) is seated in the wheelchair.

Figures 3, 4, 5:
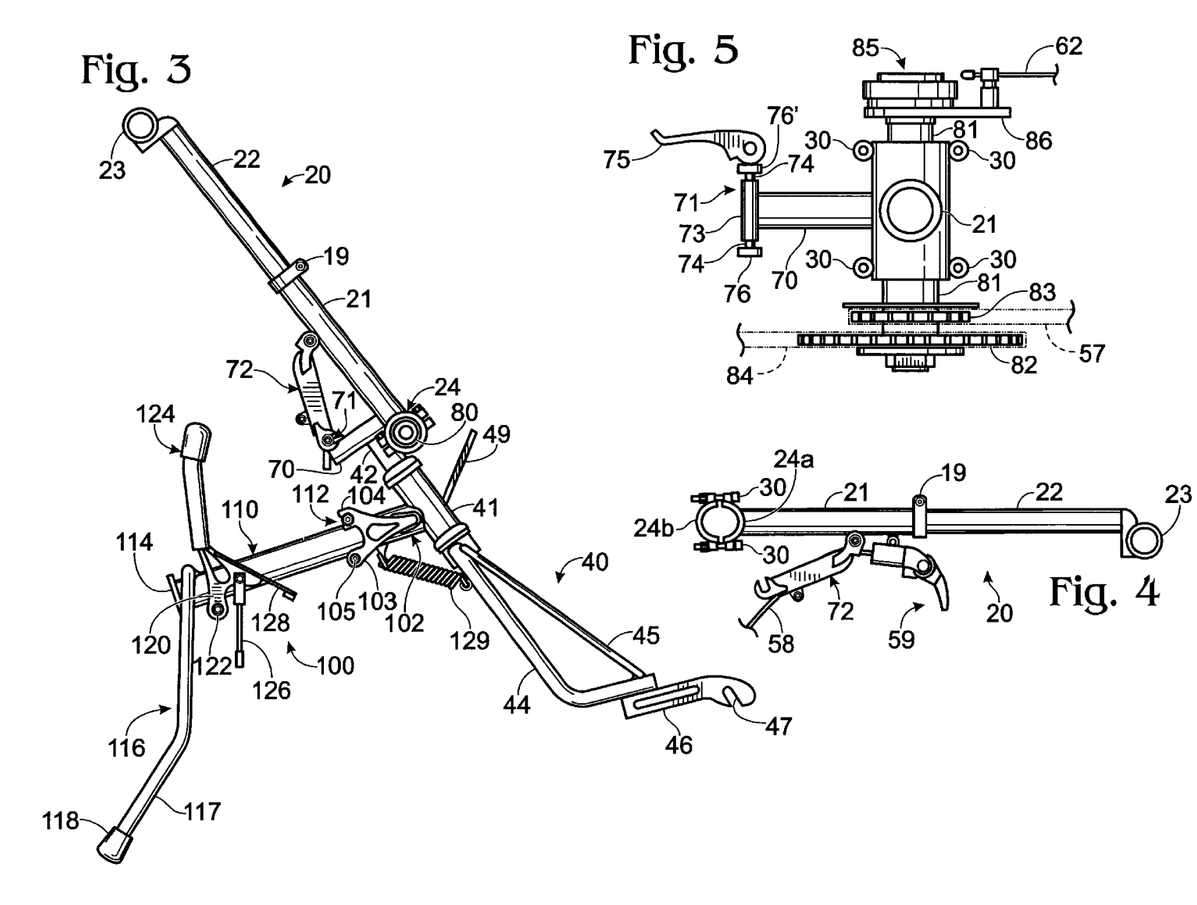
FIG. 3 is a right side elevation view of the frame of the folding unicycle of the present invention.
FIG. 4 is an enlarged left side elevation view of the upper drive train subassembly frame of the folding unicycle of the present invention.
FIG. 5 is an enlarged top plan view of the drive train pivot axle of the folding unicycle of the present invention.

The frame of foldable unicycle 10 is shown in FIG. 3 and includes an upper drive train subassembly 20, a lower drive train subassembly 40 and a wheelchair attachment subassembly 100.

Upper drive train subassembly 20 includes a head tube 21, an upper steering tube 22 adjustably received and locked within head tube 21, a crank axle housing 23 located at the outer end of upper steering tube 22, and a folding mechanism sleeve 24 (formed of two half-sleeves 24a and 24b) attached to the lower end of head tube 21 (as best seen in FIG. 4). Half-sleeves 24a and 24b are, substantially, one-half of a tubular cylinder. Upper steering tube 22 can be adjusted inwardly and outwardly relative to head tube 21 to accommodate the trunk height of the wheelchair occupant, and locked into position by suitable locking means, such as ring clamp 19 located over a slot (not shown) in the wall of head tube 21. Such adjustment may require the addition or substraction of links from chain 84.

Figure 2:
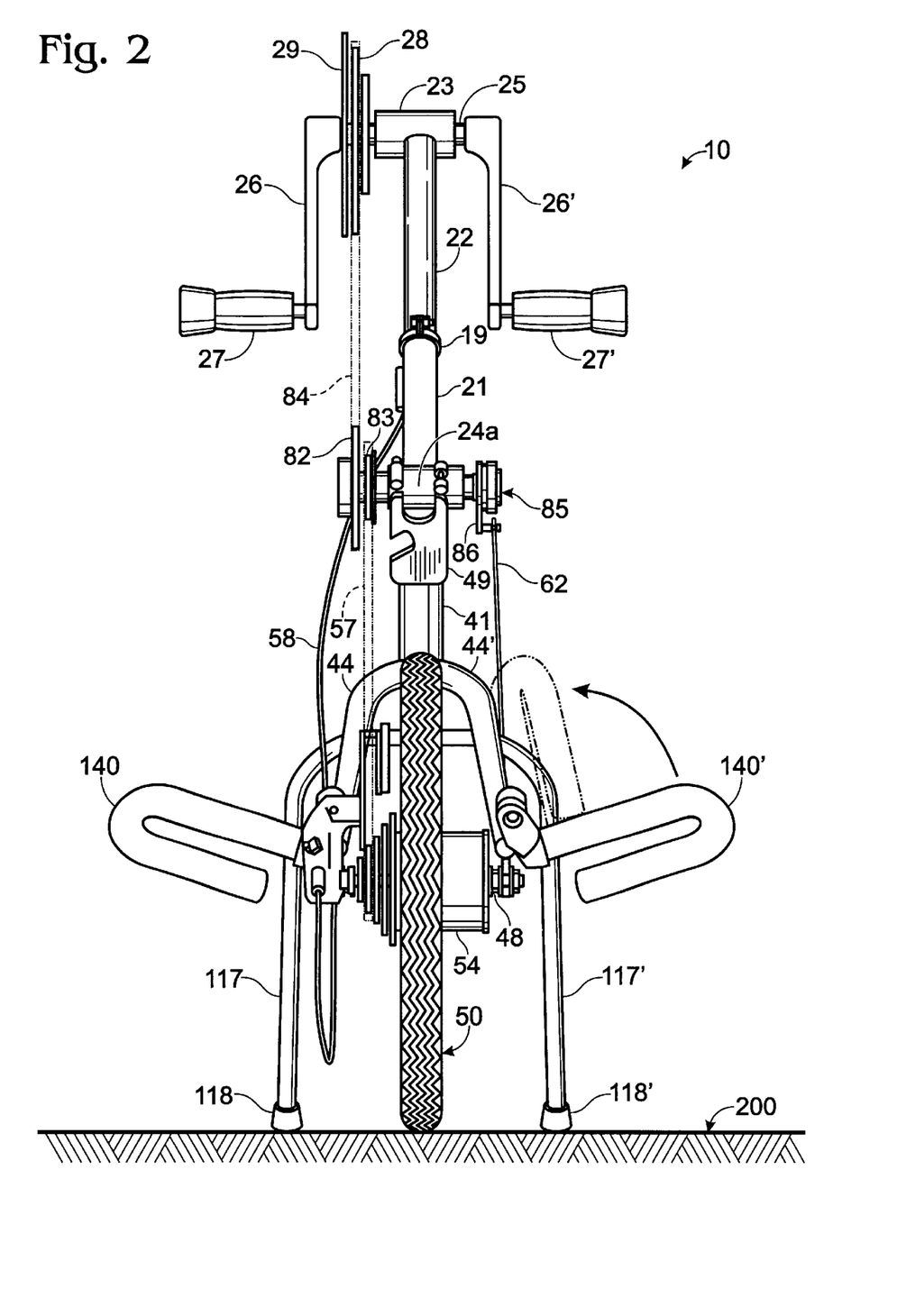
FIG. 2 is a front elevation view of the folding unicycle of the present invention.

As best seen in FIG. 2, a crank axle 25 extends through crank axle housing 23 and is suitably journaled in bearings located at each end (not shown) of crank axle housing 23. Right and left crank arms 26 and 26' are each attached at one end to the right and left outer ends of crank axle 25, respectively, and right and left handles 27 and 27' are attached to the other ends of right and left crank arms 26 and 26', respectively. An upper drive sprocket subassembly is attached to the right side of crank axle 25 at a location between right crank arm 26 and the right end of crank axle housing 23, said upper drive sprocket subassembly including hand crank drive sprocket 28 and associated guard 29.

Crank axle housing 23, crank axle 25, right and left crank arms 26, 26', and hand crank drive sprocket 28 are available as a single unit called "Mountain Drive" manufactured by Schlumph, and described in U.S. Pat. No. 5,609,071.

Figure 6:
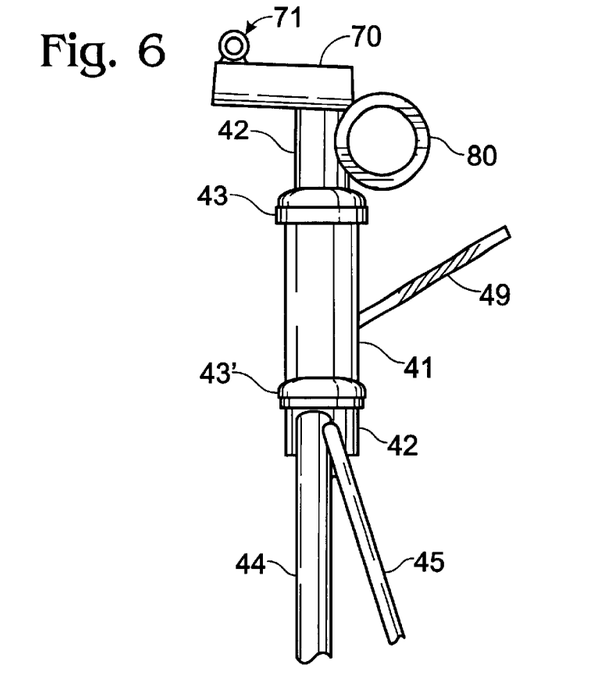
FIG. 6 is an enlarged right side elevation view of the upper portion of the lower drive train subassembly.

As best seen in FIGS. 3 and 6, lower drive train subassembly 40 includes fork tube 41, lower steering tube 42 extending through fork tube 41, an upper ball bearing retainer assembly 43 and a lower ball bearing retainer assembly 43'. Upper and lower ball bearing retainer assemblies 43 and 43' can be any of those typically used in American-type bicycle headsets.

A notched head tube rest stop 49 (best seen in FIG. 2) extends outwardly and upwardly from the front side of fork tube 41.

The upper ends of right and left fork blades 44 and 44' are attached to the lower end of lower steering tube 42, such as by welding.

It is known in the bicycle art that a problem arises when the steering bar is not directly above the front or steering wheel. When the steering is moved behind the wheel and the angle between the steering device and the wheel becomes more obtuse, the wheel develops a tendency to flop to one side unless held in the upright position. The more obtuse the angle between the steering unit and the effected wheel, the more pronounced this tendency becomes. In order to reduce this problem, fork blades 44 and 44' have a substantial rake angle between their upper and lower portions, the rake angle being between about 75 degrees and about 90 degrees.

Right and left strut members 45 and 45' extend between the lower and upper ends of right and left fork blades 44 and 44', respectively, and provide additional rigidity to the lower drive train frame.

Right and left dropout members 46 and 46' are attached to the lower ends of right and left fork blades 44 and 44', respectively, and have slots 47, 47' for receiving axle 48 of wheel 50. Although shown as separate parts, right and left dropout members 46 and 46' may be made integral with the lower ends of right and left fork blades 44, 44', such construction being common in many bicycles.

Figure 7:
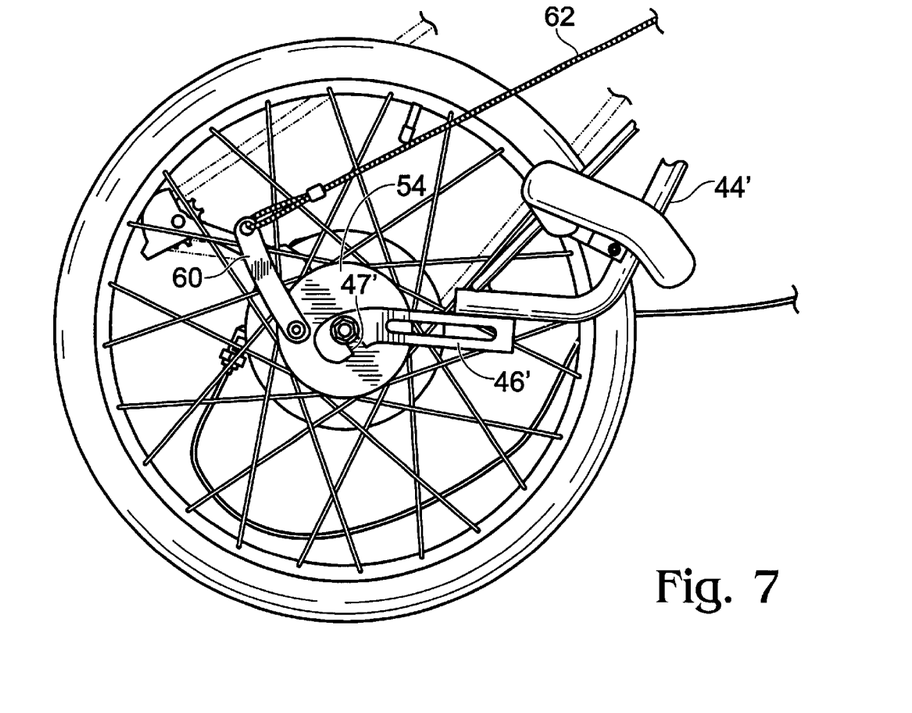
FIG. 7 is a left side elevation view of the unicycle wheel.

Drive wheel 50 is a conventional bicycle wheel, and includes a pneumatic tire 51 mounted on a rim 52 supported by a plurality of spokes 53 attached at one end to the flanges of a hub 54 and at the other end to the rim 52 in a manner conventional in the bicycle art.

Drive wheel 50 includes a conventional sprocket (freewheel) cluster 55 (shown as being located on the right side) attached to axle 48, and a conventional derailleur 56 (such as the Shimano "DeFore LX") attached to right dropout member 46. The sprocket cluster 55 may contain any number of gears between about three and nine, preferably about six.

Derailleur 56 communicates a lower drive chain 57 with one of the gears of the sprocket cluster 55. Derailleur 56 is operated by means of derailleur cable 58 attached at one end thereto and at its other end to a conventional derailleur adjustment lever 59 mounted on head tube 21.

Drive wheel hub 54 (best seen in FIG. 7) contains a coaster brake subassembly having a lower brake arm 60 (shown as being located on the left side). A brake cable 62 is attached at one end to lower brake arm 60 and at its other end to an upper brake arm 86 (FIG. 5).

Drive wheel 50, hub 54 (including the coaster brake subassembly with lower brake arm 60), and sprocket cluster 55 are available as a single unit manufactured by Sachs as the "Orbit HT".

As best seen in FIGS. 5 and 6, a cam clamp arm 70 is attached to the upper outer end of lower steering tube 42, such as by welding. A conventional quick release cam clamp 71 for the upper drive train latch 72 is attached to the upper surface of cam clamp arm 70. Cam clamp 71 includes a cam clamp axle housing 73, a cam clamp axle 74, a cam clamp lever arm 75 attached to the outer end of axle 74, and clamping members 76, 76'. The space between clamping members 76, 76' and the adjacent ends of axle housing 73 allow the forked ears of upper drive train latch 72 to be received around axle 74 (as best seen in FIG. 3) and clamped into place by rotating cam clamp lever arm 75 into its locking position.

A tubular bottom bracket axle mechanism housing 80 is attached to an outer wall portion of lower steering tube 42 extending above fork tube 41, such as by welding. An axle mechanism 81 extends through tubular bottom bracket axle housing 80. Axle mechanism 81 includes an axle (not shown) that is journaled therein by use of suitable bearings to allow the axle to rotate within axle mechanism 81.

As best seen in FIG. 5, the right side outer end of the axle of axle mechanism 81 has outer and inner intermediate drive sprockets 82 and 83 attached thereto in a manner such that rotation of outer intermediate drive sprocket 82 causes inner intermediate drive sprocket 83 to rotate. Outer intermediate drive sprocket 82 communicates with hand crank drive sprocket 28 by means of upper drive chain 84 (shown in phantom in FIGS. 1 and 5) and inner intermediate drive sprocket 83 communicates with derailleur 56 and sprocket cluster 55 by means of lower drive chain 57 (shown in phantom in FIGS. 1 and 5).

Axle mechanism 81 is the type used in the bottom bracket of coaster braking type bicycles, and allows outer and inner sprockets 82 and 83 to remain immobile during coasting and to actuate coaster braking through upper coaster brake mechanism 85 when cranks 26, 26' are reversed from their normal clockwise driving direction.

Upper coaster brake mechanism 85 includes an upper brake arm 86 that communicates with lower brake arm 60 by means of brake cable 62. The entire coaster brake mechanism, including that portion contained in wheel hub 54 and upper coaster brake mechanism 85, can be any conventional bicycle coaster brake mechanism.

Upper drive train subassembly 20 is rotatably attached to axle mechanism housing 80 by placing the two half sleeves 24a and 24b around the housing and inserting and tightening the four lock bolts 30 to the point where subassembly 20 can still be rotated about housing 80. Half sleeves 24a and 24b have suitable cutouts (not shown) to allow lower steering tube 42 to be attached to axle mechanism housing 80.

Figure 9:
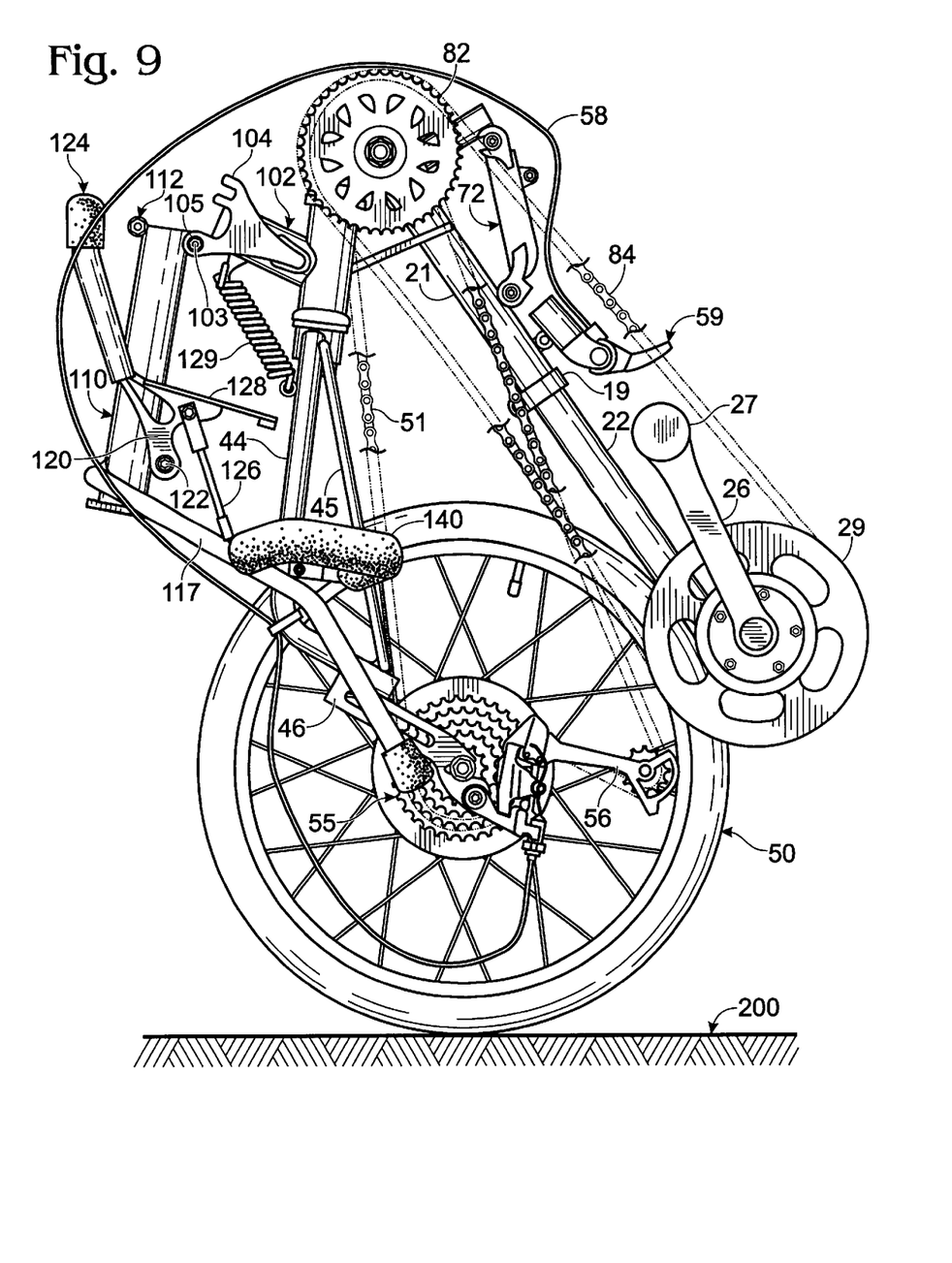
FIG. 9 is a right side elevation view of the folding unicycle of the present invention shown in its fully folded position.

As best seen in FIGS. 3 and 9, wheelchair attachment subassembly 100 of unicycle 10 includes an anchor member 102 and a swivel arm 110 pivotally attached thereto.

Anchor member 102 is attached at its inner end to fork tube 41, such as by welding. At its outer end, anchor member 102 is split into a pair of identical and parallel lower arms 103 (only the right lower arm 103 being shown) and identical and parallel forked upper arms 104 (as best seen in FIG. 9, only the right upper arm 104 being shown).

Lower arms 103 each have an opening passing therethrough for receiving a pivot bolt 105 therethrough. Bosses attached to the lower inner end of swivel arm 110 (not shown) have openings passing therethrough which are in alignment with the openings in lower arms 103, and pivot bolt 105 extends through all of these openings. A nut (not shown) is attached to the outer end of pivot bolt 105. As a result of this construction, swivel arm 110 can be pivoted away from anchor member 102 about pivot bolt 105, as best seen in FIG. 9.

Upper arms 104 each have a forked terminus (see FIG. 9) adapted to be received by cam clamp 112, which is attached to the top inner end of swivel arm 110 such as by welding. Cam clamp 112 is not shown in detail, but is identical in construction and operation to cam clamp 71 shown in FIG. 5. Swivel arm 110 can be pivoted upwardly from the position shown in FIG. 9 so that the forked termini of upper arms 104 engage cam clamp 112 and can be locked into place in the position shown in FIG. 3 by turning the cam lever of cam clamp 112 to its locking position.

A rectangular hitch block 114 is attached to the rear end of swivel arm 110, such as by welding.

As best seen in FIGS. 2 and 3, a positioning stand 116 is located inwardly of hitch block 114. Positioning stand 116 is, essentially, an inverted U-shaped tubular member with its base welded to swivel arm 110. Right and left legs 117, 117' extend downwardly from the base with their rubber covered tips 118, 118' in contact with the ground 200 (see FIG. 2) prior to attachment of unicycle 10 to wheelchair 12. In this position, drive wheel 50 and legs 117, 117' form a tripod to maintain unicycle 10 in the standing position shown in FIG. 2.

An attachment latching mechanism includes a bifurcated lever arm 120 pivotally attached at its lower end to pivot pin 122 and having a covered handle 124 at its upper end. An essentially rectangular-shaped attachment stirrup 126 is pivotally attached at its upper end to bifurcated lever arm 120. An essentially rectangular stirrup stop member 128 is pivotally attached at its upper end to bifurcated lever arm 120 above attachment stirrup 126 and surrounds swivel arm 110.

Right and left stabilizing spring members 129 extend between, and are attached to, anchor member 102 and right and left fork blades 44, 44' (only the right spring member 129 being shown in FIGS. 1 and 3). Similarly, a third stabilizing spring member 129 (not shown) extends between anchor member 102 and the base of steering tube 42. Stabilizing spring members 129 reduce the tendency of the wheel 50 to turn from side to side during hand pedaling, and increases the tendency of the wheel 50 to point straight ahead regardless of the user's stroke technique without limiting the turning radius of the wheel.

Having both crank arms 26, 26' facing in the same direction, as shown in FIG. 2, has also been found to help reduce wobbling since pedaling power is being applied to right and left crank arms 26, 26' in the same direction at the same time. However, crank arms 26, 26' may be positioned in opposite directions, such as shown in U.S. Pat. No. 4,720,117 and others.

Wheelchair 12 has a hitch means 130 which includes a tubular tongue 131 having a hitch socket 132 attached to the outer end thereof, such as by welding. Hitch socket 132 includes a generally rectangular hitch plate 133 having a slotted lip 134 extending outwardly from its upper edge, a ramp 135 extending downwardly and outwardly from its lower edge, and a locking ledge 136 extending along its inner lower edge. Tongue 131 is attached to the wheelchair frame by right and left side bracket members 137, only the right side bracket members 137 being shown in FIG. 1. Where the wheelchair 12 is of the folding type, right and left side bracket members 137 can be made to be foldable relative to the wheelchair frame and/or tongue 131.

Figure 8A:
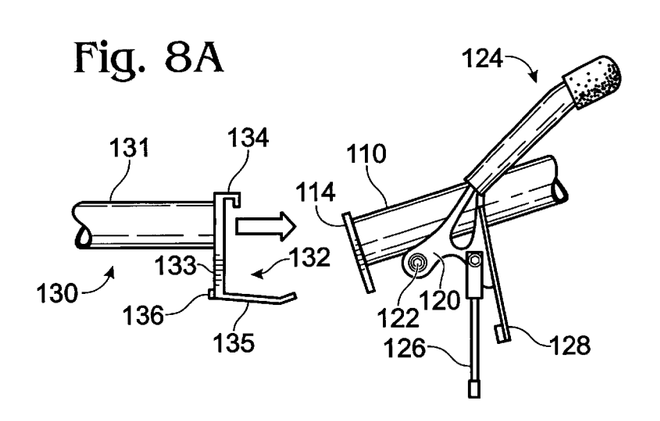
FIG. 8A is an enlarged right side elevation view of the wheelchair attachment means positioned adjacent the attachment receptor means of the wheelchair.
Figure 8B:
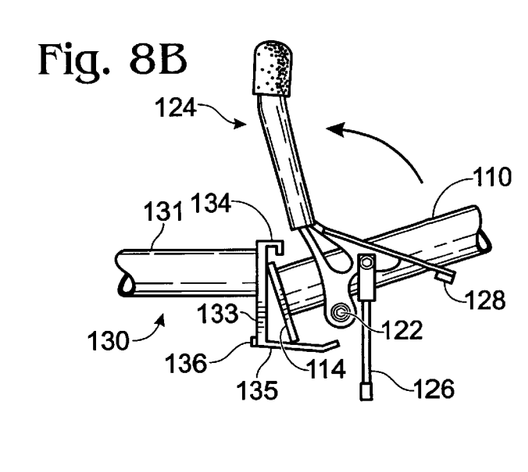
FIG. 8B is an enlarged right side elevation view of the wheelchair attachment means of the folding unicycle of the present invention shown in its initial contact position with the attachment receptor means of a wheelchair.
Figure 8C:
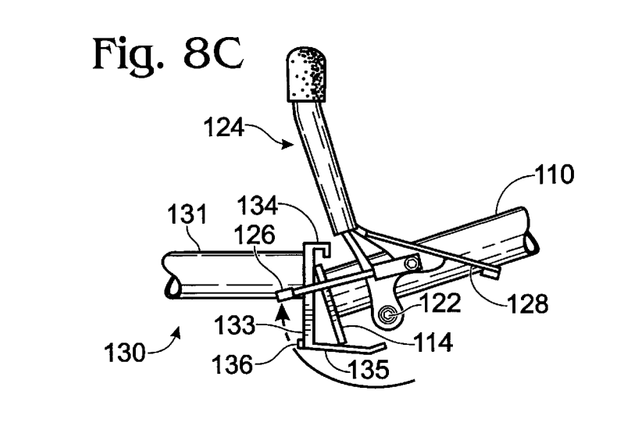
FIG. 8C is an enlarged right side elevation view of the wheelchair attachment means of the folding unicycle of the present invention shown with its stirrup swiveled into position behind the attachment receptor means of a wheelchair.
Figure 8D:
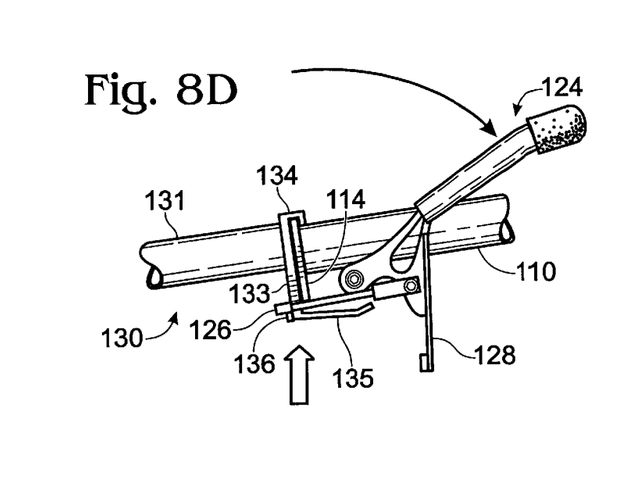
FIG. 8D is an enlarged right side elevation view of the wheelchair attachment means of the folding unicycle of the present invention shown in full locking engagement with the attachment receptor means of a wheelchair.

FIGS. 1 and 8A–8D show how the attachment subassembly 100 attaches unicycle 10 to a wheelchair 12. In FIGS. 8A–8D, positioning stand 116 has been omitted for the sake of clarity. In attaching unicycle 10 to wheelchair 12, unicycle 10 is placed in the tripodal position shown in FIG. 2. Hitch means 130 of wheelchair 12 is then brought into close proximity to the wheelchair attachment subassembly 100 of unicycle 10, in the direction shown by the arrow in FIG. 8A. The bottom of hitch block 114 engages ramp 135 at an angle, as shown in FIG. 8B. Handle 124 is pulled backwardly towards the wheelchair occupant, in the direction shown by the arrow in FIG. 8B, and hitching stirrup 126 raised into position behind hitch plate 133, in the direction shown by the arrow in FIG. 8C. Handle 124 is then pushed forwardly, in the direction shown by the small arrow in FIG. 8D, and hitching stirrup 126 hand guided into place on top of locking ledge 136 behind hitch plate 133. As handle 124 is pushed forwardly, the upper edge of hitch block 114 is pulled into engagement with the slot in slotted lip 134 with the bottom edge of hitch block 114 resting against ramp 135 with hitching stirrup 126 resting on ledge 136 and in tight engagement with the back of hitch plate 133. During the hitching operation, i.e., during forward movement of handle 124, the longitudinal axes of swivel arm 110 and tongue 131 move upwardly in the direction shown by the large arrow in FIG. 8D and are brought into alignment, thereby lifting the small front castor wheels 14 of wheelchair 12 upwardly and out of engagement with the ground 200 and into the position shown in FIG. 1. Simultaneously, positioning stand 116 is pulled upwardly and out of engagement with the ground 200, as also shown in FIG. 1.

To disengage the unicycle 10 from wheelchair 12 the procedure just described is reversed.

Foldable right and left foot rests 140 and 140' are rotatably attached to right and left fork blades 117 and 117', respectively. Both foot rests 140 and 140' may be folded up against their respective fork blades in the direction shown by the arrow in FIG. 2. Footrests 140 and 140' may be those manufactured by Quickie and sold as their "foam covered tubular style" footrests for wheelchairs. Suitable straps (not shown) may be used to hold the user's feet in place on the foot rests 140 and 140'.

When it is desired to store or transport unicycle 10, the unicycle can be folded into the position shown in FIG. 9. The procedure in folding unicycle 10 is to first disengage cam clamp 72 by turning cam clamp lever 75 to its released position, and lowering upper drive train portion 20 to the position shown in FIG. 9. In this folded position, head tube 21 rests against the notch in head tube stop rest 49. Next, cam clamp 112 is disengaged by turning its cam clamp lever to its release position, and lowering the wheelchair attachment subassembly 110 to the position shown in FIG. 9.

To reassemble unicycle 10 to the operating position shown in FIGS. 1 and 2, the procedure just described is reversed.

It will be obvious to those having skill in the art that many changes may be made to the details of the above-described embodiments of this invention without departing from the underlying principles thereof. The scope of the present invention should, therefore, be determined only by the following claims.

The invention claimed is:

1. In a hand driven unicycle having attachment means for attaching said unicycle to hitch means located on a wheelchair to thereby form a hand driven tricycle, the improvement comprising:
   a positioning stand attached to said unicycle, said positioning stand adapted to hold said unicycle in a position to allow said hitch means of said wheelchair to be moved into latching engagement with said attachment means of said unicycle;
   and latching means for releasably latching said attachment means to said hitch means.

2. The unicycle of claim 1 wherein said positioning stand is attached to said attachment means.

3. The unicycle of claim 2 wherein said positioning stand is tubing substantially in the shape of an inverted U having a base and legs extending downwardly from each end of said base, said base being attached to said attachment means.

4. The unicycle of claim 1 wherein said latching means for releasably latching said attachment means to said hitch means is adapted to lift said positioning stand upwardly during latching of said attachment means to said hitch means.

5. A unicycle for attachment to hitch means located on a wheelchair to form a tricycle, said unicycle comprising:
   a lower drive train subassembly including a lower drive train frame, a drive wheel rotatably attached to the lower end of said lower drive train frame, said drive wheel having associated wheel sprocket means for driving said drive wheel, said lower drive train frame having first and second intermediate drive sprockets rotatably attached adjacent to its upper end, said first intermediate drive sprocket drivingly communicating with said wheel sprocket means by chain means;
   an upper drive train subassembly including an upper drive train frame, a hand crank mechanism rotatably attached to the upper end of said upper drive train frame, said hand crank mechanism including a hand crank sprocket drivingly communicating with said second intermediate drive sprocket by chain means;
   said upper drive train frame being pivotally attached to said lower drive train frame;
   attachment means adapted to releasably latch said attachment means of said unicycle to said hitch means of said wheelchair; and
   a positioning stand attached to said unicycle, said positioning stand adapted to hold said unicycle in a position to allow said hitch means located on said wheelchair to be moved into latching engagement with said attachment means of said unicycle.

6. The unicycle of claim 5 wherein said positioning stand is attached to said attachment means.

7. The unicycle of claim 5 wherein said attachment means is pivotally attached to said unicycle.

8. The unicycle of claim 7 wherein said hitch means located on said wheel chair includes a hitch socket, said unicycle attachment means including:
   an anchor member attached to said lower drive train frame;
   a swivel arm having inner and outer ends, said inner end of said swivel arm being pivotally attached to said anchor member;
   a hitch block located adjacent to said outer end of said swivel arm and adapted to be received into said hitch socket;
   a latching means lever arm pivotally attached to said swivel arm inwardly of said hitch block and adapted to move from a first, unlatching position to a second, latching position; and
   an attachment stirrup pivotally attached to said lever arm and adapted to be seated behind said hitch socket and to be pulled into tight engagement therewith by movement of said lever arm from its first, unlatching position to its second, latching position, said movement also causing said hitch block to become tightly latched within said hitch socket.

9. The unicycle of claim 8 wherein said positioning stand is tubing substantially in the shape of an inverted U having a base and legs extending downwardly from each end of said base, said base being attached to said swivel arm of said attachment means between said hitch block and said latching means lever arm.

10. The unicycle of claim 9 wherein said latching means for releasably latching said attachment means to said hitch means is adapted to lift said positioning stand upwardly during latching of said attachment means to said hitch means.

11. The unicycle of claim 5 wherein said lower drive train frame includes a fork tube, a lower steering tube journaled for rotation within said fork tube, right and left fork blades attached to the lower end of said lower steering tube, said drive wheel being rotatably attached to the lower ends of said fork blades, and a bottom bracket axle housing attached to the upper sidewall of said lower steering tube, said bottom bracket axle housing having a bottom bracket axle rotatably mounted therein and said first and second intermediate drive sprockets are attached to said bottom bracket axle.

12. The unicycle of claim 5 wherein said upper drive train frame includes a head tube, said head tube being pivotally attached at its lower end to said bottom bracket axle housing, an upper steering tube having a lower portion adjustably mounted within said head tube, said upper steering tube having an upper end with said hand crank mechanism mounted thereon.

13. The unicycle of claim 12 wherein said head tube is pivotally attached at its lower end to said bottom bracket axle housing by a folding mechanism sleeve, said sleeve at least partially surrounding said bottom bracket axle housing.

14. The unicycle of claim 13 wherein said sleeve includes a first half-sleeve attached to the lower end of said head tube and a second half-sleeve attached to said first half-sleeve by threaded fasteners.

15. A unicycle for attachment to hitch means located on a wheelchair, said hitch means including a hitch socket, comprising:

a lower drive train subassembly including a fork tube, a lower steering tube journaled for rotation within said fork tube, right and left fork blades attached to the lower end of said lower steering tube, a drive wheel rotatably attached to the lower ends of said fork blades, said drive wheel having associated wheel sprocket means for driving said drive wheel, a bottom bracket axle housing attached to the upper sidewall of said lower steering tube, a bottom bracket axle extending through said bottom bracket axle housing, said bottom bracket axle having first and second intermediate drive sprockets attached to one end thereof, said first intermediate drive sprocket drivingly communicating with said wheel sprocket means by chain means;

an upper drive train subassembly including a head tube, said head tube being pivotally attached at its lower end to said bottom bracket axle housing, an upper steering tube having a lower portion adjustably mounted within said head tube, said upper steering tube having an upper end with a hand crank mechanism attached thereto, said hand crank mechanism including a hand crank sprocket drivingly communicating with said second intermediate drive sprocket by chain means;

attachment means for attaching said unicycle to the hitch means of said wheelchair said unicycle attachment means including an anchor member attached to said lower drive train frame, a swivel arm having inner and outer ends, said inner end of said swivel arm being pivotally attached to said anchor member, a hitch block located at said outer end of said swivel arm and adapted to be received into said hitch socket, a latching means lever arm pivotally attached to said swivel arm inwardly of said hitch block and adapted to move from a first, unlatching position to a second, latching position, and an attachment stirrup pivotally attached to said lever arm and adapted to be seated behind said hitch socket and be to pulled into tight engagement therewith by movement of said lever arm from its first, unlatching position to its second, latching position, said movement also causing said hitch block to become tightly latched within said hitch socket; and a positioning stand formed of tubing and substantially in the shape of an inverted U having a base and legs extending downwardly from each end of said base, said base being attached to said swivel arm of said attachment means at a location between said hitch block and said latching means lever arm, said positioning stand adapted to hold said unicycle in a position to allow said hitch means of said wheelchair to be moved into latching engagement with said attachment means of said unicycle.

\* \* \* \* \*